(12) United States Patent
Gendler et al.

(10) Patent No.: US 9,471,088 B2
(45) Date of Patent: Oct. 18, 2016

(54) RESTRICTING CLOCK SIGNAL DELIVERY IN A PROCESSOR

(71) Applicant: Intel Corporation, Santa Clara, CA (US)

(72) Inventors: Alexander Gendler, Kiriat Motzkin (IL); Efraim Rotem, Haifa (IL); Julius Mandelblat, Haifa (IL); Alexander Lyakhov, Haifa (IL); Larisa Novakovsky, Haifa (IL); George Leifman, Haifa (IL); Lev Makovsky, Haifa (IL); Ariel Sabba, Karmiel (IL); Niv Tokman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 454 days.

(21) Appl. No.: 13/925,986

(22) Filed: Jun. 25, 2013

(65) Prior Publication Data

US 2014/0380081 A1 Dec. 25, 2014

(51) Int. Cl.
*G06F 1/08* (2006.01)
*G06F 1/04* (2006.01)
*G06F 1/32* (2006.01)

(52) U.S. Cl.
CPC . *G06F 1/08* (2013.01); *G06F 1/04* (2013.01); *G06F 1/32* (2013.01)

(58) Field of Classification Search
CPC ............... G06F 1/04; G06F 1/08; G06F 1/32
See application file for complete search history.

(56) References Cited

U.S. PATENT DOCUMENTS

| 5,163,153 | A | 11/1992 | Cole et al. |
| 5,522,087 | A | 5/1996 | Hsiang |
| 5,590,341 | A | 12/1996 | Matter |
| 5,621,250 | A | 4/1997 | Kim |
| 5,931,950 | A | 8/1999 | Hsu |
| 6,260,175 | B1 | 7/2001 | Basel |
| 6,748,546 | B1 | 6/2004 | Mirov et al. |
| 6,792,392 | B1 | 9/2004 | Knight |
| 6,823,516 | B1 | 11/2004 | Cooper |
| 6,829,713 | B2 | 12/2004 | Cooper et al. |
| 6,903,575 | B1 | 6/2005 | Davidson et al. |
| 6,996,728 | B2 | 2/2006 | Singh |

(Continued)

FOREIGN PATENT DOCUMENTS

| EP | 1 282 030 A1 | 5/2003 |
| EP | 2194442 A1 | 6/2010 |

OTHER PUBLICATIONS

European Patent Office, European Office Action mailed Dec. 4, 2014, in European Patent Application No. 14178658.2.

(Continued)

*Primary Examiner* — Thomas Lee
*Assistant Examiner* — Chad Erdman
(74) *Attorney, Agent, or Firm* — Trop, Pruner & Hu, P.C.

(57) ABSTRACT

In an embodiment, a processor includes a core to execute instructions, where the core includes a clock generation logic to receive and distribute a first clock signal to a plurality of units of the core, a restriction logic to receive a restriction command and to reduce delivery of the first clock signal to at least one of the plurality of units. The restriction logic may cause the first clock signal to be distributed to the plurality of units at a lower frequency than a frequency of the first clock signal. Other embodiments are described and claimed.

16 Claims, 11 Drawing Sheets

(56) References Cited

U.S. PATENT DOCUMENTS

| | | |
|---|---|---|
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 7,958,285 B1 | 6/2011 | Chiu et al. |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0006720 A1 | 1/2004 | Atkinson |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0129860 A1 | 6/2006 | Kazachinsky et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0214342 A1 | 9/2007 | Newburn |
| 2007/0239398 A1 | 10/2007 | Song et al. |
| 2007/0245163 A1 | 10/2007 | Lu et al. |
| 2008/0005607 A1 | 1/2008 | Fukatsu et al. |
| 2008/0028240 A1 | 1/2008 | Arai et al. |
| 2008/0250260 A1 | 10/2008 | Tomita |
| 2008/0256381 A1 | 10/2008 | Jacobowitz et al. |
| 2008/0307240 A1 | 12/2008 | Dahan et al. |
| 2009/0006871 A1 | 1/2009 | Liu et al. |
| 2009/0063888 A1* | 3/2009 | Gold et al. ............. 713/501 |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2009/0293061 A1* | 11/2009 | Schwinn ............ G06F 9/3851 718/103 |
| 2010/0083011 A1 | 4/2010 | Onouchi et al. |
| 2010/0115309 A1 | 5/2010 | Carvalho et al. |
| 2010/0146513 A1 | 6/2010 | Song |
| 2010/0191997 A1 | 7/2010 | Dodeja et al. |
| 2011/0154090 A1 | 6/2011 | Dixon et al. |
| 2012/0042151 A1* | 2/2012 | Sager et al. .............. 712/43 |
| 2012/0079290 A1 | 3/2012 | Kumar |
| 2012/0110352 A1* | 5/2012 | Branover et al. ......... 713/300 |
| 2012/0166764 A1* | 6/2012 | Henry et al. .............. 712/43 |
| 2012/0246506 A1 | 9/2012 | Knight |
| 2012/0260057 A1 | 10/2012 | Eyeman et al. |
| 2013/0047166 A1* | 2/2013 | Penzes ............ H03K 3/0315 718/105 |
| 2013/0061064 A1 | 3/2013 | Ananthakrishnan et al. |
| 2013/0080803 A1 | 3/2013 | Ananthakrishnan et al. |
| 2013/0080804 A1 | 3/2013 | Ananthakrishan et al. |
| 2013/0111120 A1 | 5/2013 | Ananthakrishnan et al. |
| 2013/0111121 A1 | 5/2013 | Ananthakrishnan et al. |
| 2013/0111143 A1 | 5/2013 | Kurihara et al. |
| 2013/0111226 A1 | 5/2013 | Ananthakrishnan et al. |
| 2013/0111236 A1 | 5/2013 | Ananthakrishnan et al. |
| 2013/0155073 A1* | 6/2013 | Khodorkovsky ......... G06F 3/14 345/501 |
| 2013/0191677 A1 | 7/2013 | Ziesler et al. |
| 2014/0052966 A1* | 2/2014 | Vahidsafa et al. ............ 712/220 |
| 2014/0053008 A1 | 2/2014 | Rozas |
| 2014/0097877 A1* | 4/2014 | Baeckler et al. ............ 327/149 |
| 2014/0181556 A1* | 6/2014 | Eckert et al. ............... 713/323 |
| 2014/0223211 A1 | 8/2014 | Ries et al. |
| 2014/0237272 A1* | 8/2014 | Sadowski ............... 713/320 |

OTHER PUBLICATIONS

European Search Report mailed Nov. 6, 2014, in European Patent Application No. 14173679.3.
Intel Developer Forum, IDF2010, Opher Kahn, et al., "Intel Next Generation Microarchitecture Codename Sandy Bridge: New Processor Innovations," Sep. 13, 2010, 58 pages.
SPEC-Power and Performance, Design Overview V1.10, Standard Performance Information Corp., Oct. 21, 2008, 6 pages.
Intel Technology Journal, "Power and Thermal Management in the Intel Core Duo Processor," May 15, 2006, pp. 109-122.
Anoop Iyer, et al., "Power and Performance Evaluation of Globally Asynchronous Locally Synchronous Processors," 2002, pp. 1-11.
Greg Semeraro, et al., "Hiding Synchronization Delays in A GALS Processor Microarchitecture," 2004, pp. 1-13.
Joan-Manuel Parcerisa, et al., "Efficient Interconnects for Clustered Microarchitectures," 2002, pp. 1-10.
Grigorios Magklis, et al., "Profile-Based Dynamic Voltage and Frequency Scalling for a Multiple Clock Domain Microprocessor," 2003, pp. 1-12.
Greg Semeraro, et al., "Dynamic Frequency and Voltage Control for a Multiple Clock Domain Architecture," 2002, pp. 1-12.
Greg Semeraro, "Energy-Efficient Processor Design Using Multiple Clock Domains with Dynamic Voltage and Frequency Scaling," 2002, pp. 29-40.
Diana Marculescu, "Application Adaptive Energy Efficient Clustered Architectures," 2004, pp. 344-349.
L. Benini, et al., "System-Level Dynamic Power Management," 1999, pp. 23-31.
Ravindra Jejurikar, et al., "Leakage Aware Dynamic Voltage Scaling for Real-Time Embedded Systems," 2004, pp. 275-280.
Ravindra Jejurikar, et al., "Dynamic Slack Reclamation With Procrastination Scheduling in Real-Time Embedded Systems," 2005, pp. 13-17.
R. Todling, et al., "Some Strategies for Kalman Filtering and Smoothing," 1996, pp. 1-21.
R.E. Kalman, "A New Approach to Linear Filtering and Prediction Problems," 1960, pp. 1-12.
International Application No. PCT/US2012/028865, filed Mar. 13, 2012, entitled "Providing Efficient Turbo Operation of a Processor," by Intel Corporation.
International Application No. PCT/US2012/028902, filed Mar. 13, 2012, entitled "Dynamically Controlling Interconnect Frequency in a Processor," by Intel Corporation.
International Application No. PCT/US2012/028876, filed Mar. 13, 2012, entitled "Dynamically Computing an Electrical Design Point (EDP) for a Multicore Processor," by Intel Corporation.
U.S. Appl. No. 13/600,568, filed Aug. 31, 2012, entitled, "Configuring Power Management Functionality in a Processor," by Malini K. Bhandaru, et al.
U.S. Patent and Trademark Office, Office Action mailed Jun. 12, 2015 and Reply filed Sep. 9, 2015, in U.S. Appl. No. 13/951,646.
United States Patent and Trademark Office, Notice of Allowance mailed Mar. 4, 2016 in U.S. Appl. No. 13/951,646.

* cited by examiner

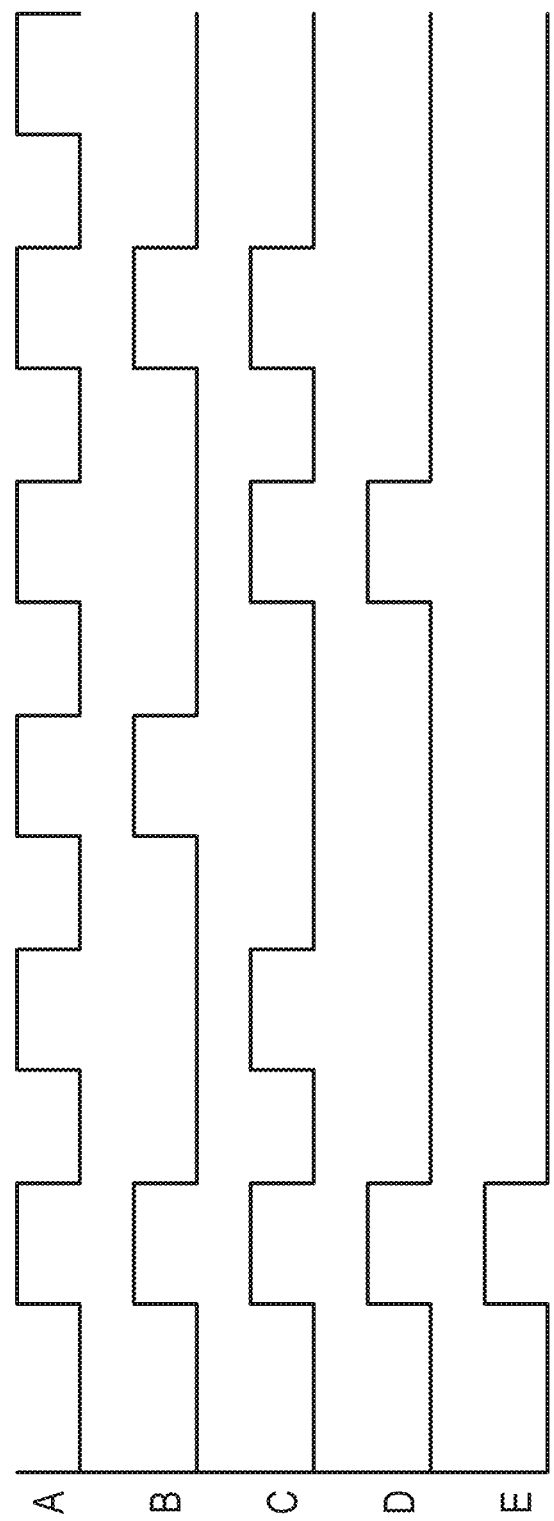

RESTRICTING CLOCK SIGNAL DELIVERY IN A PROCESSOR

TECHNICAL FIELD

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

It is known that power consumption is reduced by lowering an operating frequency at which a core runs. However, not only does reduced frequency reduce power consumption, it further reduces performance. Furthermore, very complicated procedures are involved in changing frequencies in a processor.

BRIEF DESCRIPTION OF THE DRAWINGS

FIG. 2B includes illustrations of timing diagrams in accordance with an embodiment present invention.

DETAILED DESCRIPTION

In various embodiments, a clock reduction technique is provided to enable at least portions of circuitry of a core or other logic unit of a processor to operate at a reduced operating frequency in a low latency manner that has little or no impact on other portions of the processor. This is so, as a frequency change protocol typically performed that increases latency of a frequency change is avoided. Furthermore, this clock reduction technique may be transparent to other portions of the processor, which continue to operate with a view of the affected circuitry as being at a full clock speed. In this way, greater opportunities for power conservation can be realized, as the technique enables near instantaneous reduction in clock frequency and thus reduces power consumption without the overhead of conventional low power state entry and exit.

Figure 1:
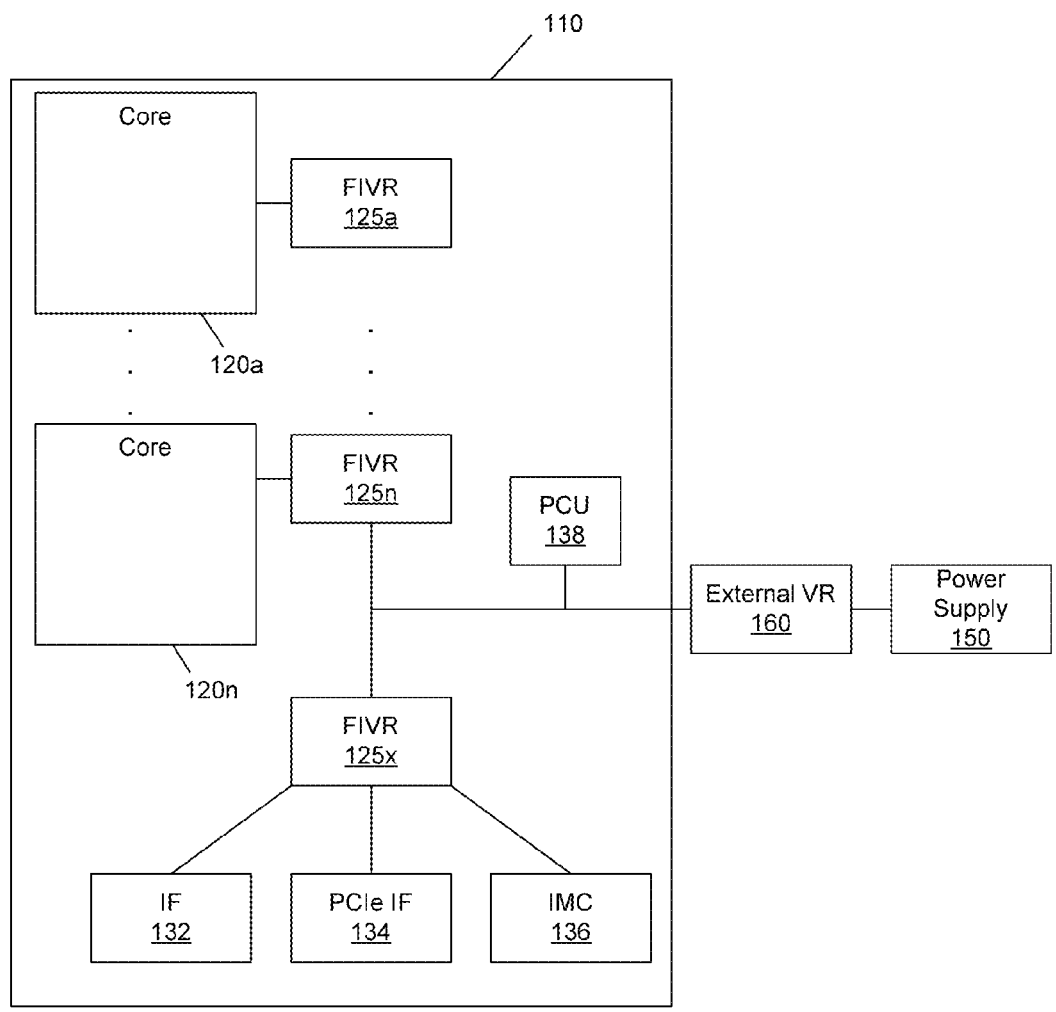
FIG. 1 is a block diagram of a system in accordance with one embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an individual voltage regulator $125_a$-$125_n$. Accordingly, a fully integrated voltage regulator (FIVR) implementation may be provided to allow for fine-grained control of voltage and thus power and performance of each individual core. As such, each core can operate at an independent voltage and frequency, enabling great flexibility and affording wide opportunities for balancing power consumption with performance.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. In various embodiments, PCU 138 may include logic to determine that a reduction in an operating frequency for one more units of a processor is desired, and to instruct such units to perform a clock reduction operation with low latency by squashing or restricting communication of clock signals to circuitry of the units, as described herein.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the clock reduction techniques described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth). In general, the clock reduction techniques described herein may be performed while a processor operates in an active state, e.g., a C0 state.

Figure 2A:
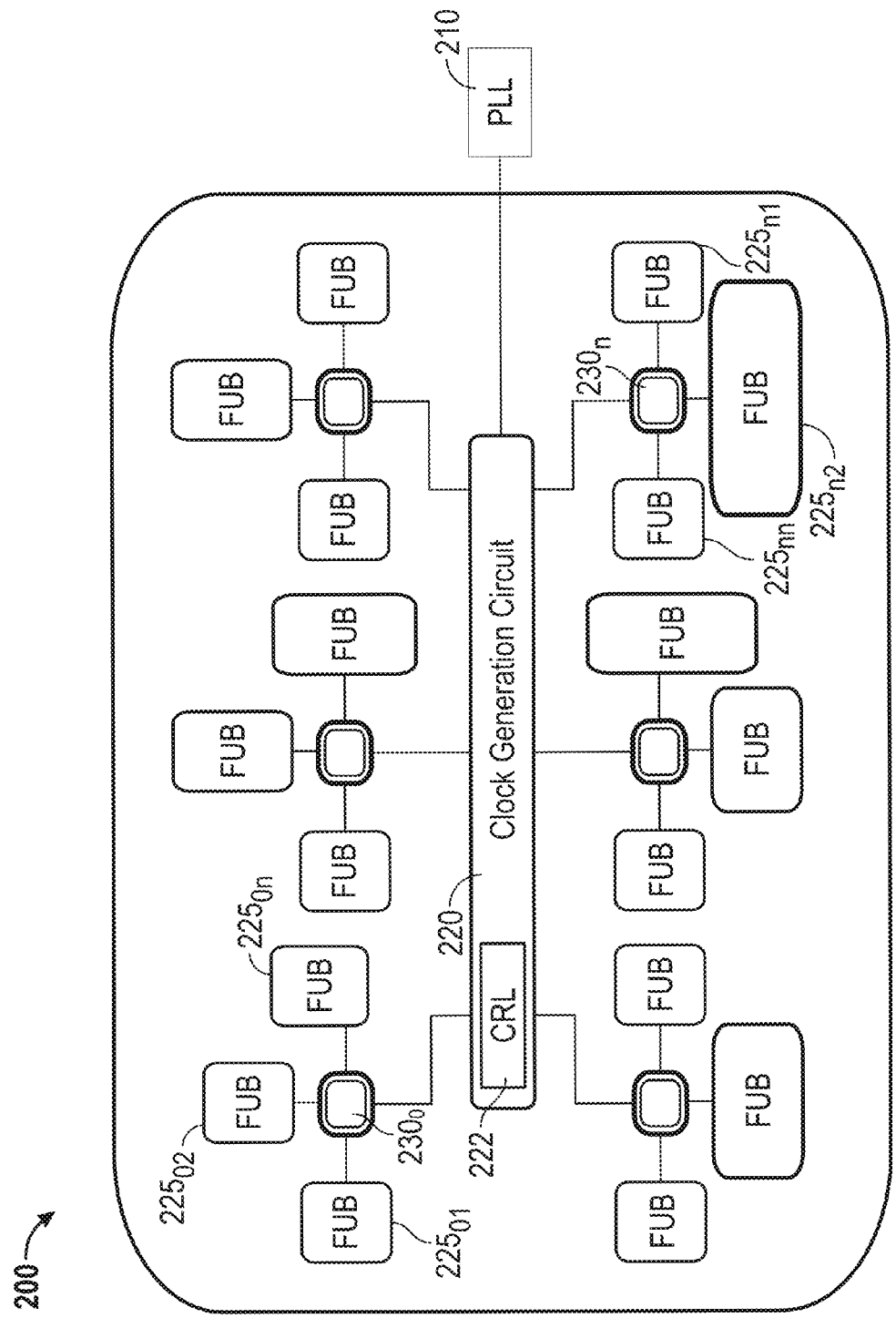
FIG. 2A is a block diagram of a portion of a processor in accordance with an embodiment of the present invention.

Referring now to FIG. 2A, shown is a block diagram of a portion of a processor in accordance with an embodiment of the present invention. As shown in FIG. 2A, a core 200 is present. In various embodiments, core 200 may be one of multiple cores of a multicore processor. Furthermore, while this particular implementation in the example is in the context of a processor core, the clock reduction techniques described herein are applicable to other circuitry of a processor or other integrated circuit (IC) such as graphics processors, specialized processing units and so forth. As seen, core 200 receives an incoming clock signal from a phase lock loop (PLL) 210, which may be part of a system agent or uncore portion of a processor. This incoming clock signal may be provided at an operating frequency determined, e.g., by a power controller of the processor such as a power control unit. This incoming clock signal is provided to a clock generation circuit 220.

In general, clock generation circuit 220 is configured to receive the incoming clock and distribute it to various functional unit blocks of the processor. In some embodiments, clock generation circuit 220 may process the incoming clock signal, e.g., to reduce its operating frequency for distribution to certain functional unit blocks. Or in other embodiments, clock generation circuit 220 may generally operate to simply distribute this incoming clock signal to various processor circuitry. According to various embodiments, clock generation circuit 220 includes a clock restriction logic 222 that receives a clock restriction command, e.g., from a PCU or other source (not shown for ease of illustration in FIG. 2A) and controls clock generation circuit 220 to reduce distribution of the incoming clock signal to at least certain ones of the functional unit blocks. Note that the squashing or other clock reduction techniques do not modify a pulse width of the clock signal; instead it simply squashes or removes cycles of this incoming clock signal from being communicated to one or more of the logic blocks. More specifically in an embodiment, clock restriction logic 222 may selectively provide either a restricted clock signal or the unrestricted incoming clock signal to each of a plurality of global drivers $230_0$-$230_n$ in an independent manner.

To provide an appropriate clock signal to each of multiple functional units (FUBs) $225_{01}$-$225_m$, clock generation circuit 220 outputs one or more versions of the incoming clock signal to a plurality of global drivers $230_0$-$230_n$. In general, each functional unit corresponds to a portion of the processor circuitry such as various front end units, execution units, and back end units such as retirement logic. Although in the particular example shown in FIG. 2A each of the global drivers is coupled to three functional unit blocks, understand the scope of the present invention is not limited in this regard and in other embodiments each driver may be coupled to many more such functional units. Furthermore, it is possible for certain functional units to directly receive a clock signal from clock generation circuit 220. Also while shown with these example number of global drivers and functional unit blocks, understand that many more such units may be present in other embodiments.

Referring now to FIG. 2B, shown are illustrations of timing diagrams in accordance with an embodiment of the present invention. As shown in FIG. 2B, a clock generation circuit such as that of FIG. 2A receives an incoming clock signal A at a first frequency. This incoming clock signal may be at a level corresponding to an unrestricted clock frequency. For example, a PLL may drive this clock signal to a core at a frequency of, e.g. 2.4 gigahertz (GHz) in a normal operating mode. Instead in a turbo mode, the PLL may drive this clock signal A at a higher, turbo mode frequency, e.g., 3.0 GHz. Of course other values are possible and understand further that in certain low power operation, the signal may be driven to the core at a lower frequency.

Nevertheless, to enable lower power operation with reduced latency, thus avoiding the need for stopping a core or performing other synchronization operations, using a clock restriction command in accordance with an embodiment, incoming clock signal A can be restricted, e.g., by removing clock cycles before it is distributed to at least certain logic of the processor. Thus as seen in FIG. 2B, based on a received clock signal A, one of various restricted clock signals B, C, D or E may be caused to be generated in the clock generation circuit and provided to at least certain portions of the core. Note that both regular duty cycles such as shown in clock signals B, D and E are possible, as well as an irregular duty cycle such as shown in clock signal C. In the illustration of FIG. 2B, clock signal B corresponds to a duty cycle of 33%, where only one of 3 cycles of clock signal A is output. Clock signal D illustrates a duty cycle of 25%, where only 1 of 4 cycles of clock signal A is output, and clock signal E illustrates an even lower duty cycle. In some embodiments, only one of 16 cycles of an incoming clock signal may be output to logic of the core. Note as to clock signal C, 2 cycles are output for every 3 cycles of incoming clock signal A. Understand that many other examples are possible and that embodiments are not limited in this regard. In an embodiment, logic circuitry such as combinational logic may be used to generate a desired output clock signal from clock generation circuit 250 responsive to a clock restriction command. As an example, the logic receives a command for clock restriction, and responsive to this command, an incoming clock signal is distributed over units of the core, which may take a number of cycles (e.g., 4). This distributed clock signal is multiplied with a spine clock in various parts of the core to perform the clock squashing. As a result, all clocks stop toggling until a squash enable signal resets and propagates with a distribution latency.

Figure 2C:
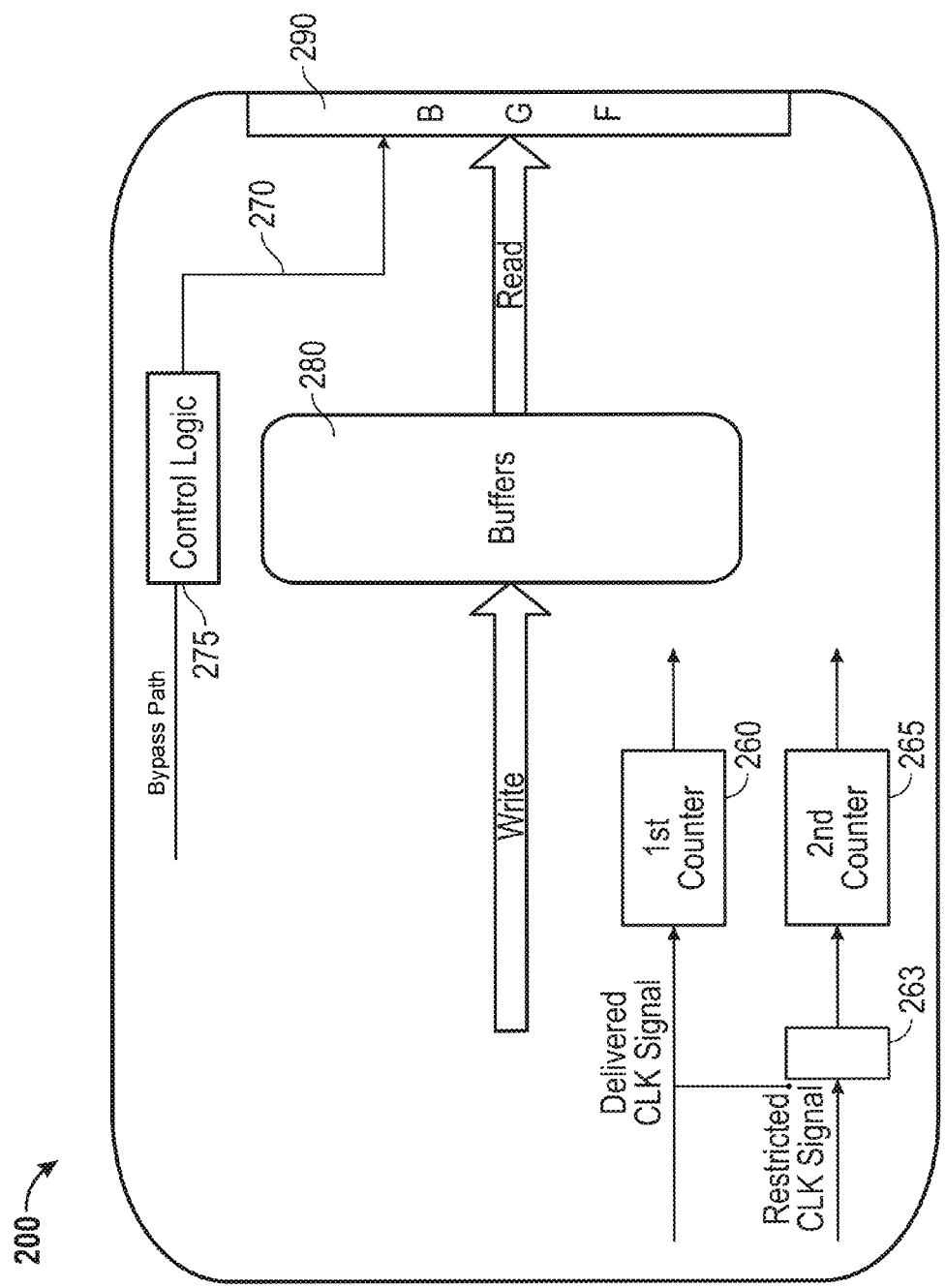
FIG. 2C is a block diagram of a portion of a core in accordance with an embodiment of the present invention.

Referring now to FIG. 2C, shown is a block diagram of a portion of a core in accordance with an embodiment of the present invention. In FIG. 2C, a different portion of core 200 is shown. More specifically here, a portion of core 200 at an output port is illustrated. A clock crossing logic 290 is provided, which may be part of an output port or other logic of the core. In an embodiment, this clock crossing logic is a bubble generator first in and first out (FIFO) buffer (BGF) that enables interconnection of the core, which operates at one operating frequency, to other processor circuitry such as uncore logic that operates at a different frequency.

To enable requests to be coupled through to BGF 290, a buffer 280 is present. In an embodiment, buffer 280 also may be a FIFO. To enable operation of the core or portions thereof at a lower clock frequency than a delivered clock frequency to the core, information may be written into buffer 280 according to a restricted clock frequency and in turn information may be read or output from buffer 280 at the unrestricted clock frequency. Note further in FIG. 2C the presence of a bypass path 270. In various embodiments, the bypass path may be used to bypass buffer 280 and for faster access. Because when a clock restriction is in place, information communicated via bypass path 270 may be at a lower frequency, during clock restriction operations, bypass path 270 may be disabled via a control logic 275, which may act as a block on this bypass path during a clock restriction operation.

Referring still to FIG. 2C, the portion of core 200 shown further includes counter circuitry, namely a first counter 260 and a second counter 265. These counters may be two of a plurality of counters present in the core. While certain counters may be used for purposes of performance monitoring or other counting operations, in an embodiment first counter 260 may be a dedicated counter to count active clock cycles while second counter 265 is another dedicated counter also to count clock cycles. Note that first counter 260 receives an incoming or delivered clock signal, namely the clock signal received by the core. Thus counter 260 counts cycles of this unrestricted clock signal frequency to provide an output corresponding to a count of such signals. In contrast, second counter 265 receives an output of a selection logic 263 which is configured to receive both this delivered clock signal as well as a restricted clock signal, when clock generation circuitry of the core generates a restricted clock signal responsive to a clock restriction command. Thus selector 263, which may be a multiplexer, is enabled to provide the delivered clock signal when no clock restriction is in place and instead to provide a restricted clock signal clock when restriction operations are occurring, such that counter 265 provides an accurate count of active cycles for the corresponding portions of core 200 that are subject to clock restriction. In this way, logic that relies on the values of these counters, which may correspond to an A counter and an M counter, receives accurate counts. In an embodiment, the A counter is a performance counter to count when the core is in an active (e.g., C0) state and which counts according to a current core clock frequency. In turn, the B counter is another performance counter to count when the core is in an active state, and which counts according to a constant clock frequency. As a result, the actual core clock frequency may be equal to a maximum frequency multiplied by the ratio of the value of the A counter to the value of the B counter. When the PCU acts as a master and commands squashing of core clocks, the A counter counts according to the squashed clock frequency and the B counter counts according to the unsquashed clock frequency.

While only a single buffer 280, which acts as an intra-die interface (IDI) is shown, understand that various channels that couple core 200 to other portions of a processor may similarly include buffers and bypass paths. For example, buffer 280 shown in FIG. 2C may be for a request channel. Similar buffers and bypass paths may be present for additional channels such as a response channel and a request channel. In addition, an input port or other portion of a core that receives information from an uncore or other core logic may similarly include buffers. For example, request, response, and data channels may be provided in an input direction as well, and similarly may include buffers and bypass path as appropriate.

Figure 3:
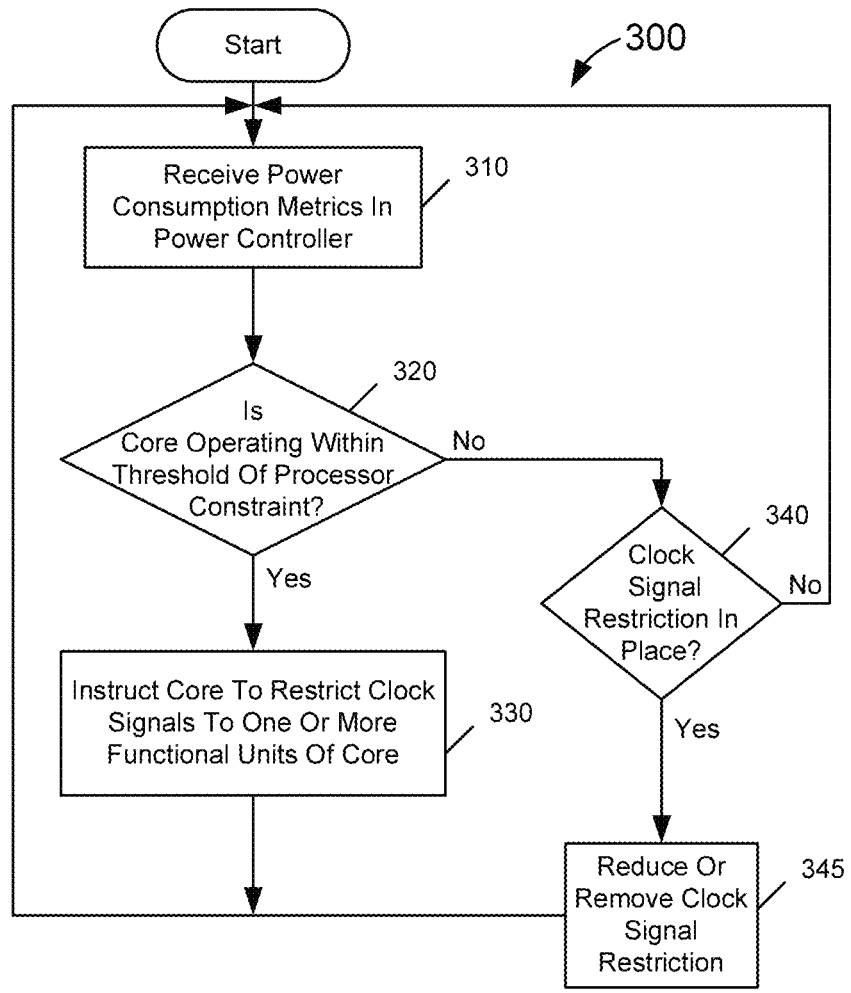
FIG. 3 is a flow diagram of a method in accordance with an embodiment of the present invention.

Referring now to FIG. 3, shown is a flow diagram of a method in accordance with an embodiment of the present invention. As shown in FIG. 3, method 300 may be performed by various logic of a processor such as present in a PCU. In general, method 300 may be performed by frequency control logic of the PCU to initiate an indication to a processor core or other logic of a processor to enter into a clock reduction operation as described herein.

Method 300 begins at block 310 in which power consumption metrics are received in a power controller, e.g., a PCU. Although the scope of the present invention is not limited in this regard, in various embodiments these power consumption metrics may take different forms, including operating parameter information such as current consumption, operating temperature, instruction execution rate, and operating voltage among many others. Next, it can be determined whether any core is operating within a threshold of a processor constraint (diamond 320). For example, based on one or more received metrics, the PCU logic can determine whether a given core is close to reaching (or has reached) a processor constraint such as a thermal constraint, a current constraint or other such constraint.

If so, control passes to block 330 where the logic can instruct the core to restrict clock signals to one or more functional units. In an embodiment, this clock restriction control information may be communicated to the core as a command to instruct the core to immediately begin a clock restriction operation. Although this command may take many forms, in an embodiment the command includes a command portion to indicate a clock reduction instruction and a data portion that indicates the measure of clock reduction to be performed. As an example, the logic can send this data portion with a value that corresponds to the number of clock cycles that are to be restricted from being delivered to the core functional units. For example, a value of "1" indicates that a single clock cycle is to be restricted for every active clock cycle. Stated another way, a value of "1" corresponds to a duty cycle of 50% with respect to the incoming clock signal. Instead a value of "2" would indicate that two clock cycles are to be restricted for every active clock cycle for a duty cycle of 33%, and so on. Of course different encodings are possible in other embodiments. In one embodiment, to effect near instantaneous adoption of the clock reduction, this command can be communicated directly to clock generation circuitry of the core such as shown above in FIG. 2A. Instead in other embodiments, this command can be distributed to the global drivers which then perform a clock multiplication to obtain the squashed clock frequency. In this way, global drivers associated with circuitry to remain at an unsquashed clock frequency may not receive the signal.

Still referring to FIG. 3, if instead at diamond 320 it is determined that the core is not operating within a threshold of a constraint, control passes to diamond 340 where it can be determined whether a clock restriction instruction is in place for the core. This restriction is in place due to a prior determination that the core is operating at or near a given constraint. If this is the case, control next passes to block 345 where the clock restriction instruction can either be removed or reduced. For example, based on the various metric information received and a resulting comparison to the one or more processor constraints, the clock signal restriction previously instructed can be terminated. Or the restriction can be reduced. For example, instead of restricting clock cycles to a duty cycle of 33%, the clock signal restriction can be reduced to enable a greater duty cycle, e.g. of 50%. Of course, other duty cycle having values greater than 50% are possible.

Figure 4:
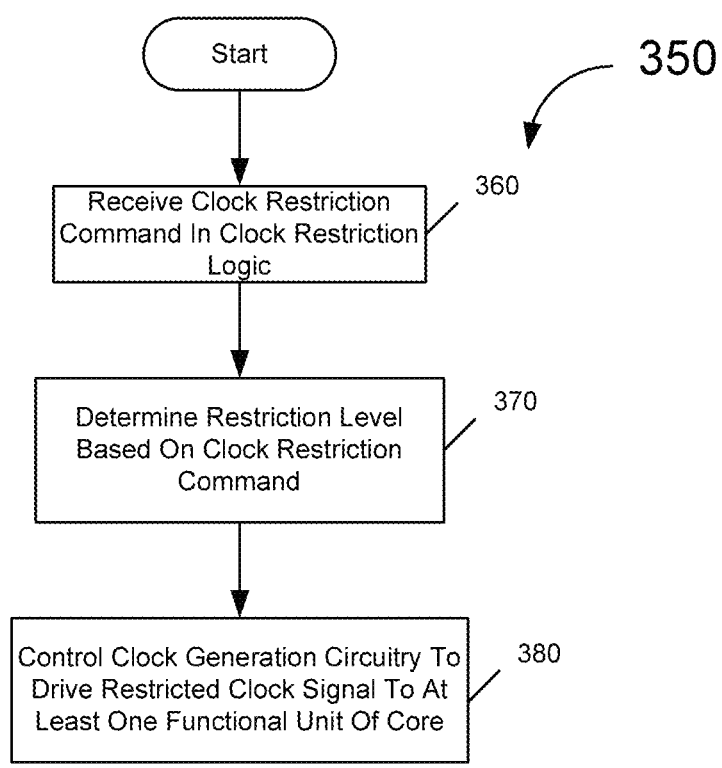
FIG. 4 is a flow diagram of a method for performing clock reduction operations in accordance with an embodiment of the present invention.

Referring now to FIG. 4, shown is a flow diagram of a method for performing clock reduction operations in accordance with an embodiment of the present invention. As shown in FIG. 4, method 350 may be performed by logic within a core or other processor circuitry. For example, method 350 may be performed by clock restriction logic within core clock generation circuitry. As seen, method 350 begins by receiving a clock reduction command in the clock restriction logic (block 360). As discussed above, this clock reduction may be communicated from a power controller of the processor. Next, control passes to block 370, where a restriction level can be determined based on the clock reduction command. For example, as described above the command may include a data portion having a restriction value to indicate the amount of clock restriction to be applied. In other implementations, some type of mapping logic enables the clock restriction logic to map the incoming command to a corresponding level of clock restriction, e.g., a given duty cycle. Note that the duty cycle time may correspond to a percentage of clocks to be provided to functional units of the core of the incoming clock signals received by the core With further reference to FIG. 4, control next passes to block 380 where the clock generation circuitry can be controlled accordingly. More specifically, the circuitry may be controlled to drive a restricted clock signal to at least one functional unit of the core. For example, clock generation circuitry 220 of FIG. 2A may receive an incoming clock signal and output one of every X incoming clock signals to the functional unit circuitry based on the clock restriction value.

The clock restriction techniques described herein can be used in many different circumstances. For example, the PCU may instruct a clock restriction command when a processor constraint has been reached or is within a threshold of a constraint, as discussed above. Such constraints may include a thermal constraint so that the clock reduction operations can be used for purposes of thermal throttling. Note that this thermal throttling realized by the clock restriction operation can be performed without the need for interrupt operations, intra-die interrupt stop or lock operations or so forth. Another such constraint may be a current consumption constraint such that an $ICC_{max}$ protection mechanism can be realized without the need to similarly perform complex operations to change a core clock frequency.

Still other embodiments may perform clock reduction operations even without a processor constraint concern. For example, embodiments may perform clock restriction operations to enable greater power to be delivered to other processor circuitry such as one or more graphics processors. When an interconnect that couples both to cores and to a graphics processors seeks to provide more bandwidth for graphics operations of the graphics processors, clock restriction may be performed to enable greater bandwidth to the graphics processors, without the need for a changing a core clock frequency. This is particularly so in instances in which one or more cores and one of more graphics processors operate in these same domain, and thus at a single voltage. By enabling reduced actual operating frequency within a core using a clock reduction technique as described herein, embodiments enable greater bandwidth and higher operating frequency for a graphics processor that operates in the same domain as the core.

Another instance for enabling clock reduction operations is to provide for a faster exit latency for one or more cores in a low power state. For example, assume one core is active in a turbo mode and thus is operating at a turbo mode frequency while another core is in a low power state, e.g., a C6 state. Instead of causing the active core exit the turbo mode and lower its operating frequency using a complex process before allowing the second core to begin the low power exit, embodiments enable concurrent low power exit by the second core while at the same time performing clock restriction operations in the first core herein to thus enable a faster exit latency for the second core.

Figure 5:
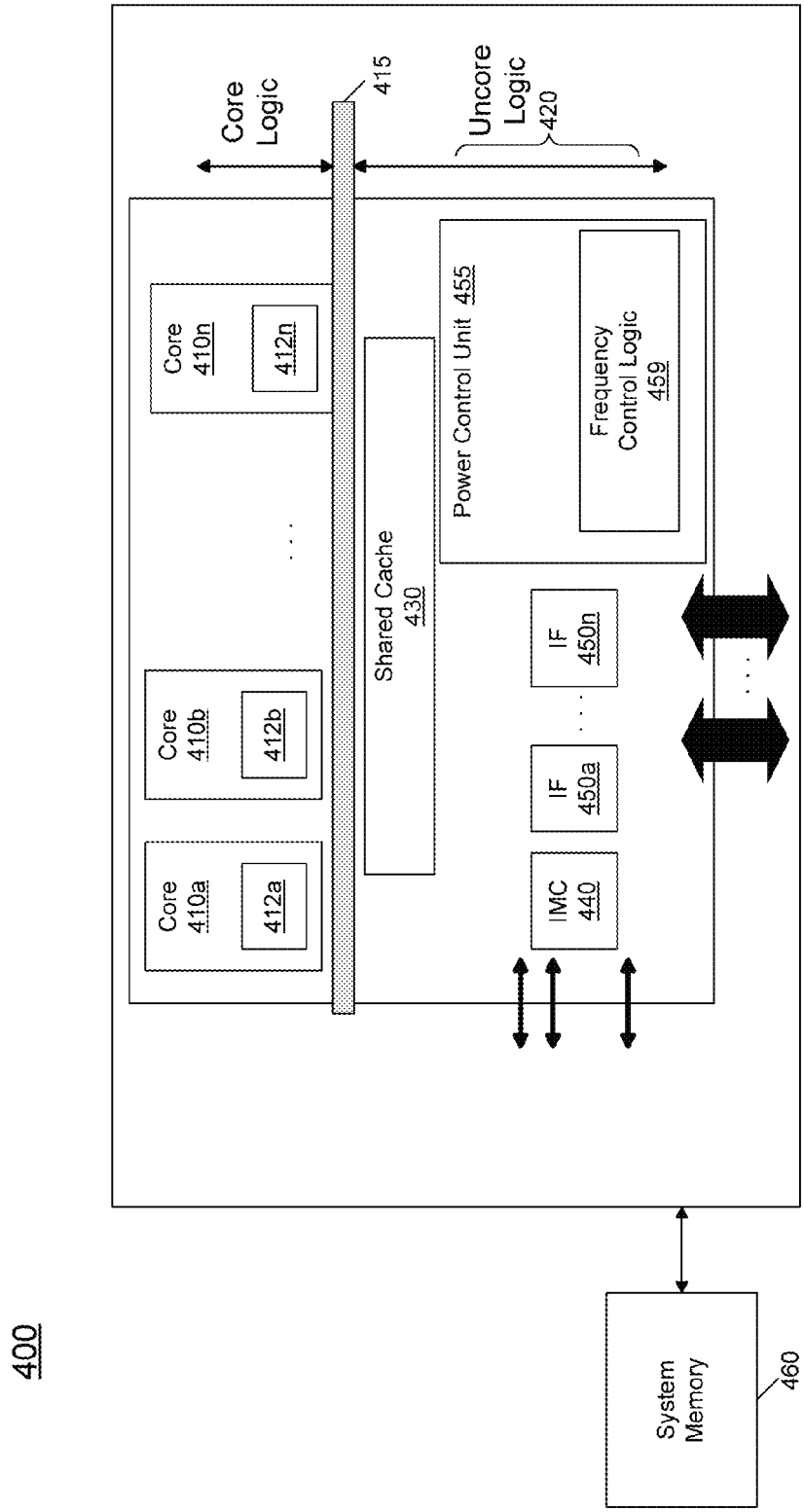
FIG. 5 is a block diagram of a processor in accordance with an embodiment of the present invention.

Embodiments can be implemented in processors for various markets including server processors, desktop processors, mobile processors and so forth. Referring now to FIG. 5, shown is a block diagram of a processor in accordance with an embodiment of the present invention. As shown in FIG. 5, processor 400 may be a multicore processor including a plurality of cores 410$_a$-410$_n$. In one embodiment, each such core may be of an independent power domain and can be configured to enter and exit active states and/or maximum performance states based on workload. As seen, each core includes a clock generation circuit 412$_a$-412$_n$ that receives an incoming clock signal and conditions it for distribution to various functional units of the core. In various embodiments, this clock generation circuitry may include clock restriction logic to receive an indication, e.g., from a power controller such as a power control unit 455 to restrict the number of clock cycles provided to some or all functional units of the core, as described herein. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455. In various embodiments, power control unit 455 may include a frequency control logic 459 in accordance with an embodiment present invention. This logic may determine an appropriate operating frequency for the various units of the processor including cores and other units, based on configuration information, environmental information, operating parameter information and so forth. Furthermore, frequency control logic 459 may determine that one or more cores is operating at or close to a constraint and accordingly, the logic may instruct the corresponding core or other unit to perform clock restriction as described herein.

With further reference to FIG. 5, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

Figure 6:
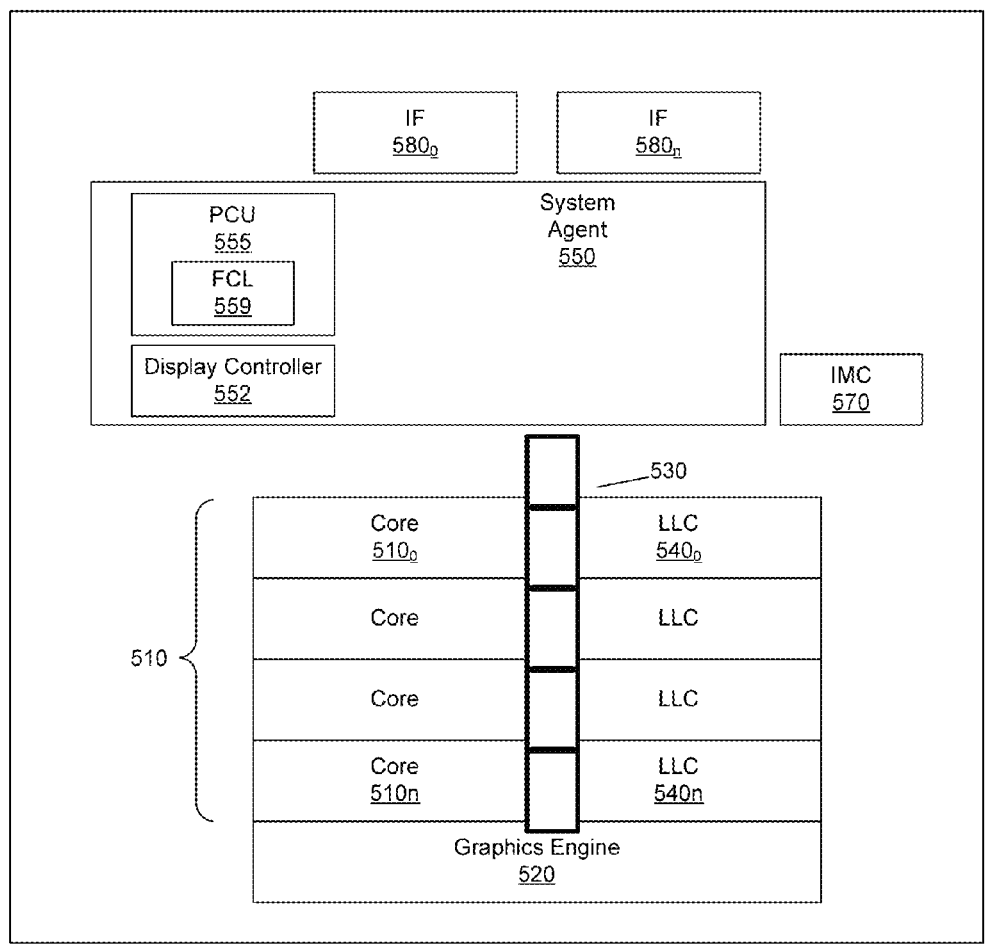
FIG. 6 is a block diagram of a multi-domain processor in accordance with another embodiment of the present invention.

Referring now to FIG. 6, shown is a block diagram of a multi-domain processor in accordance with another embodiment of the present invention. As shown in the embodiment of FIG. 6, processor 500 includes multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include a frequency control logic 559 in accordance with an embodiment of the present invention to control and operate the frequency of the cores and other portions of the processor and furthermore to trigger clock restriction operations in such units described herein. In various embodiments, this logic may execute the algorithm described above in FIG. 2.

As further seen in FIG. 6, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 6, understand the scope of the present invention is not limited in this regard.

Figure 7:
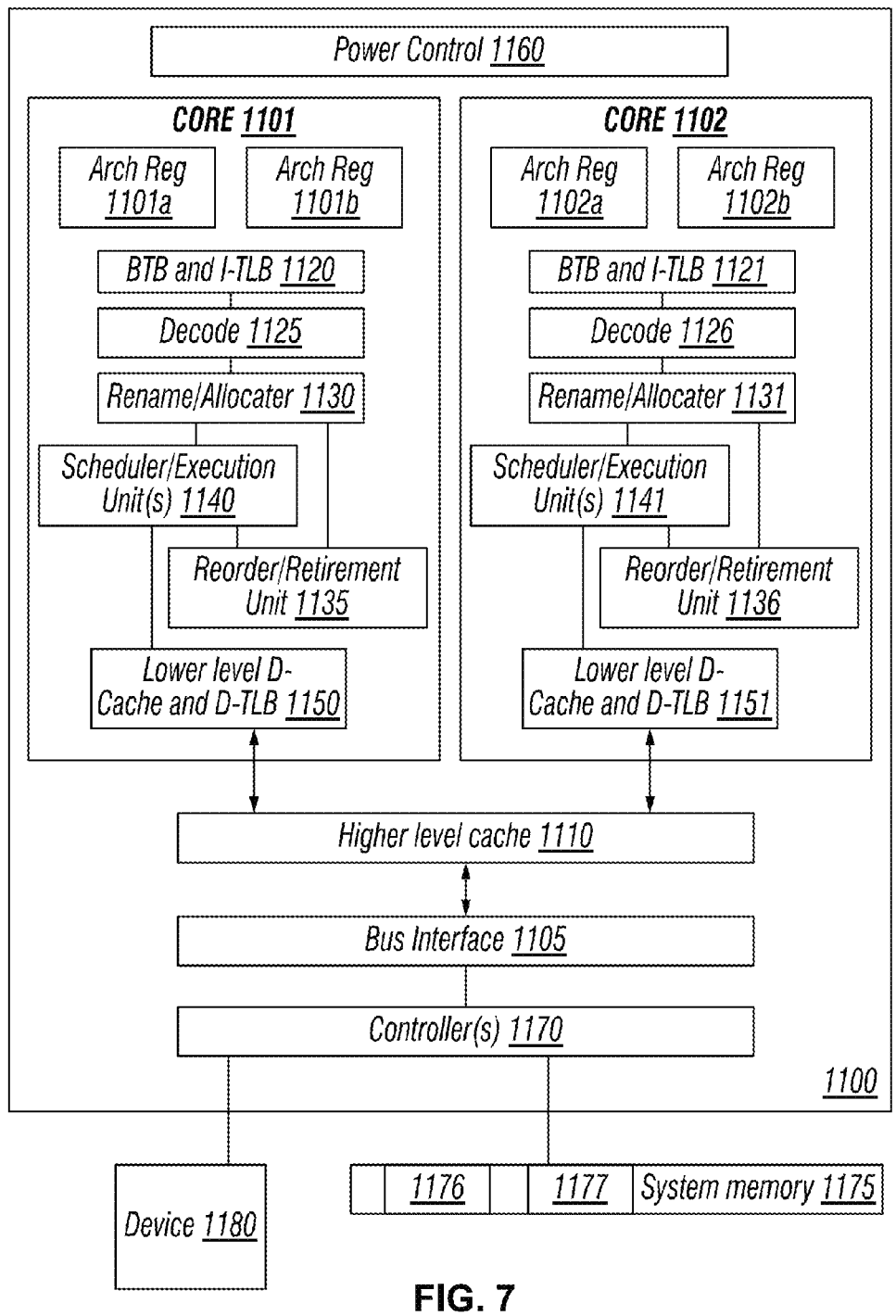
FIG. 7 is a block diagram of an embodiment of a processor including multiple cores.

Referring to FIG. 7, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 7, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101*a* and 1101*b*, which may also be referred to as hardware thread slots 1101*a* and 1101*b*. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101*a*, a second thread is associated with architecture state registers 1101*b*, a third thread may be associated with architecture state registers 1102*a*, and a fourth thread may be associated with architecture state registers 1102*b*. Here, each of the architecture state registers (1101*a*, 1101*b*, 1102*a*, and 1102*b*) may be referred to as processing elements, thread slots, or thread units, as described above. As illustrated, architecture state registers 1101*a* are replicated in architecture state registers 1101*b*, so individual architecture states/contexts are capable of being stored for logical processor 1101*a* and logical processor 1101*b*. In core 1101, other smaller resources, such as instruction pointers and renaming logic in allocator and renamer block 1130 may also be replicated for threads 1101*a* and 1101*b*. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 7, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101*a*, 1101*b*, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101*a* and 1101*b* are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 8:
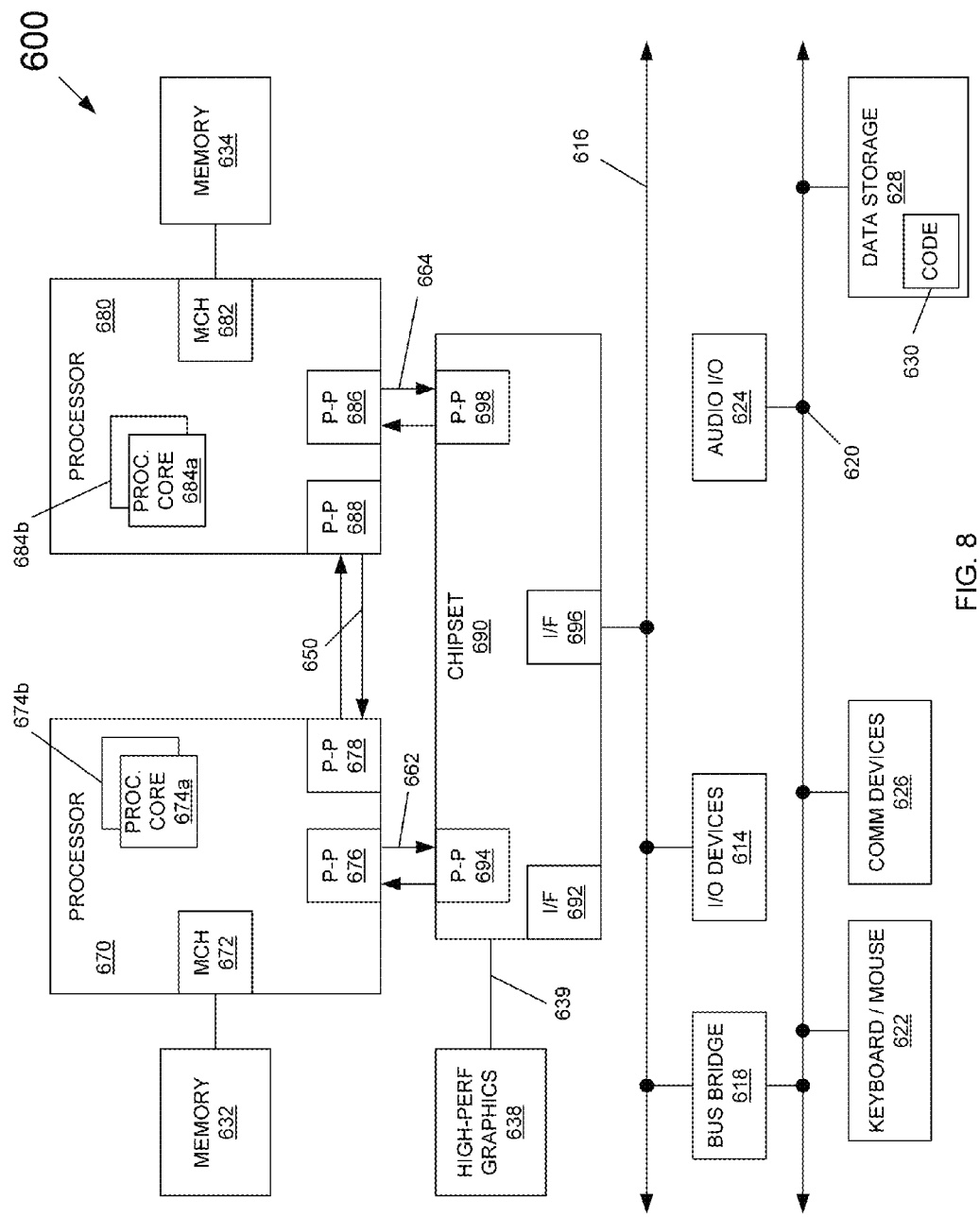
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 600 is a point-to-point interconnect system, and includes a first processor 670 and a second processor 680 coupled via a point-to-point interconnect 650. As shown in FIG. 8, each of processors 670 and 680 may be multicore processors, including first and second processor cores (i.e., processor cores 674a and 674b and processor cores 684a and 684b), although potentially many more cores may be present in the processors. Each of the processors can include a PCU or other logic to control restricted delivery of clock signals to functional units of one or more cores or other logic, to enhance power management and reduce power consumption in a variety of different situations, as described herein.

Still referring to FIG. 8, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 8, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 8, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 8, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Figure 9:
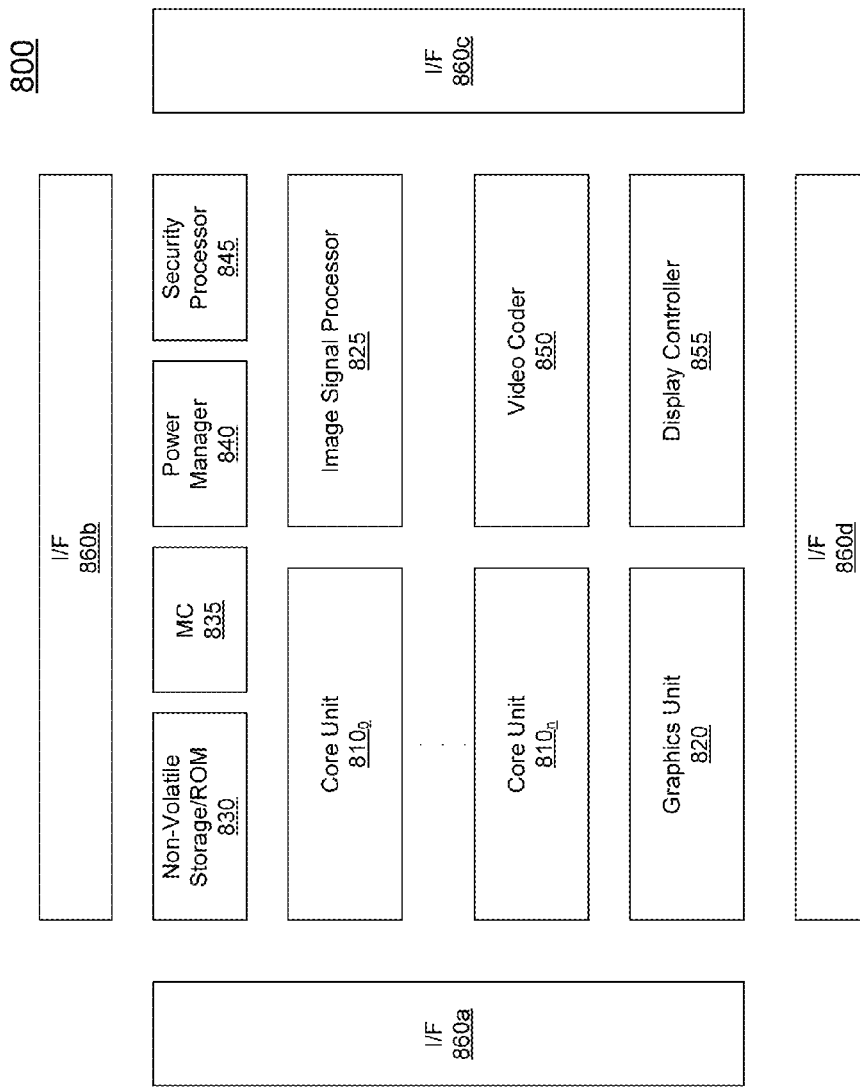
FIG. 9 is a block diagram of a processor in accordance with an embodiment of the present invention.

Embodiments can be implemented in processors for various markets including server processors, desktop processors, mobile processors and so forth. Referring now to FIG. 9, shown is a block diagram of a processor in accordance with an embodiment of the present invention. In the embodiment of FIG. 9, processor 800 may be a system on a chip (SoC) including multiple domains, each of which may be controlled to operate at an independent operating voltage and operating frequency. As a specific illustrative example, processor 800 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or customer thereof or a MIPS-based design from MIPS Technologies, Inc. of Sunnyvale, Calif., or their licensees or adopters may instead be present in other embodiments such as an Apple A5 processor, a Qualcomm Snapdragon processor, or Texas Instruments OMAP processor. Such SoC may be used in a low power system such as a smartphone, tablet computer, Ultrabook™ computer or other portable computing device.

In the high level view shown in FIG. 9, processor 800 includes a plurality of core units $810_0$-$810_n$. Each core unit may include one or more processor cores, one or more cache memories and other circuitry. Each core unit 810 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.) or other instruction set or combinations thereof. Note that some of the core units may be heterogeneous resources (e.g., of a different design). In addition, each such core may be coupled to a cache memory which in an embodiment may be a shared level (L2) cache memory. A non-volatile storage 830 may be used to store various program and other data. For example, this storage may be used to store at least portions of microcode, boot information such as a BIOS, other system software or so forth.

Each core unit 810 may also include an interface such as a bus interface unit to enable interconnection to additional circuitry of the processor. In an embodiment, each core unit 810 couples to a coherent fabric that may act as a primary cache coherent on-die interconnect that in turn couples to a memory controller 835. In turn, memory controller 835 controls communications with a memory such as a dynamic random access memory (DRAM) (not shown for ease of illustration in FIG. 9).

In addition to core units, additional processing engines are present within the processor, including at least one graphics unit 820 which may include one or more graphics processing units (GPUs) to perform graphics processing as well as to possibly execute general purpose operations on the graphics processor (so-called GPGPU operation). In addition, at least one image signal processor 825 may be present. Signal processor 825 may be configured to process incoming image data received from one or more capture devices, either internal to the SoC or off-chip. Other accelerators may also be present. In the illustration of FIG. 9, a video coder 850 may perform coding operations including encoding and decoding for video information, e.g., providing hardware acceleration support for high definition video content. A display controller 855 further may be provided to accelerate display operations including providing support for internal and external displays of a system. In addition, a security processor 845 may be present to perform security operations such as secure boot operations, various cryptography operations and so forth.

Each of the units may have its power consumption controlled via a power manager 840. Power manager 840 includes control logic to determine appropriate operating voltage and frequency for each of the domains (and in some embodiments, sub-units of the domains), e.g., based on an available power budget and request for given performance and/or low power state.

In some embodiments, SoC 800 may further include a non-coherent fabric coupled to the coherent fabric to which various peripheral devices may couple. One or more interfaces 860a-860d enable communication with one or more off-chip devices. Such communications may be according to a variety of communication protocols such as PCIe™ GPIO, USB, I2C, UART, MIPI, SDIO, DDR, SPI, HDMI, among other types of communication protocols. Although shown at this high level in the embodiment of FIG. 9, understand the scope of the present invention is not limited in this regard.

The following examples pertain to further embodiments.

According to one example, a processor includes a core to execute instructions, the core including a clock generation logic to receive and distribute a first clock signal to a plurality of units of the core, a restriction logic to receive a restriction command and to cause the clock generation logic to reduce delivery of the first clock signal to at least one of the plurality of units, where the reduced delivery of the first clock signal is at a lower frequency than a frequency of the first clock signal.

The clock generation logic is to prevent a first number of cycles of the first clock signal from being distributed to the plurality of units for each cycle of the first clock signal distributed to the plurality of units. The units include a first subset of units to receive the first clock signal with the reduced delivery and a second subset of units to receive the first clock signal without restriction. A clock crossing logic may couple the core to a system agent logic of the processor. This logic is to operate at the first clock signal without restriction, and at least one of the units is to operate at the first clock signal with the reduced delivery.

In an example processor, a buffer is coupled to the clock crossing logic. This buffer may be written according to the first clock signal with the reduced delivery and read according to the first clock signal without restriction. A bypass path may be coupled between a first unit of the plurality of units and the clock crossing logic and a second path may be coupled between the first unit and the buffer, where the bypass path is to be blocked responsive to the restriction command.

In an example, a first counter may count cycles of the first clock signal without restriction and a second counter may count cycles of the first clock signal with the reduced delivery. In one example, the restriction command may be received from a power control unit of the processor responsive to detection of a thermal event of the processor, and the clock generation logic is to perform the reduced delivery of the first clock signal without stopping the core. In another example, the restriction command may be received from the power control unit responsive to a low power state exit request for a second core, where the first clock signal at a turbo mode frequency. In turn, the second core may begin the low power state exit concurrently with the reduced delivery of the first clock signal.

Note that the above processor can be implemented using various means.

In an example, the processor comprises a system on a chip (SoC) incorporated in a user equipment touch-enabled device.

In another example, a system comprises a display and a memory, and includes the processor of one or more of the above examples.

In another example, a machine-readable medium has stored thereon instructions, which if performed by a machine cause the machine to perform a method including: receiving a clock signal in a clock generation circuit of a core of a processor; receiving a clock restriction command in clock restriction logic of the core; determining a restriction level based on the clock restriction command; and controlling the clock generation circuit according to the restriction level to drive a restricted clock signal to at least one functional unit of the core, where the restricted clock signal includes a reduced number of cycles of the clock signal.

The method may further include operating the core with the clock signal without restriction and thereafter operating the core with the restricted clock signal, without stopping the core. The method may also include determining whether the core is operating within a threshold, including comparing at least one power consumption metric to the threshold.

The method also may include receiving the clock restriction command responsive to a low power state exit request for a second core, and controlling the clock generation circuit to drive the restricted clock signal concurrently with the second core exit from the low power state.

In another example, an apparatus comprises means for performing the method of any one of the above examples.

In another example, a system includes a multicore processor having a plurality of cores, each core including a clock generator to receive and distribute a first clock signal to a plurality of units, a restriction logic to receive a clock restriction command and to cause reduced delivery of the first clock signal to at least one of the plurality of units without execution of a frequency change protocol, a power controller coupled to the plurality of cores to issue the clock restriction command responsive to an event, and a clock logic to provide the first clock signal to at least one of the plurality of cores, and DRAM coupled to the multicore processor.

In an example, a first core includes a clock crossing logic to couple the first core to another portion of the processor, the first core and the other portion to operate at different frequencies, and a buffer coupled to the clock crossing logic to be written according to the first clock signal with the reduced delivery and to be read according to the first clock signal without restriction. The first core further may include a bypass path coupled between a first unit of the plurality of units and the clock crossing logic and a second path coupled between the first unit and the buffer, wherein the bypass path is to be blocked responsive to the clock restriction command. The power controller may send the clock restriction command to the first core responsive to a low power state exit request for the second core, and the clock generator logic is to perform the reduced delivery of the first clock signal responsive to the clock restriction command concurrently with the second core low power state exit.

Understand that various combinations of the above examples are possible.

By providing a reduced number of clock signals to the functional units of the processor, power consumption is thus reduced. Furthermore, the large overhead involved in entering into low power states or causing a change to a core clock frequency can be avoided. That is, conventional techniques cause all work in the core to be halted, state to be stored, and operating frequency adjusted, state to be restored, before allowing useful work to begin again. Instead, using an embodiment of present invention, a near instantaneous operating frequency change can be effected without any of the above overhead.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a power controller to perform power management for the processor, the power controller to generate a restriction command responsive to a determination that at least one core of the processor is in operation within a threshold of a processor constraint and send the restriction command to the at least one core; and
the at least one core to execute instructions, the at least one core including a plurality of units and a clock generation logic to receive and distribute a first clock signal to the plurality of units of the at least one core, a restriction logic to receive the restriction command and responsive to the restriction command to dynamically cause the clock generation logic to reduce delivery of the first clock signal to at least one of the plurality of units while the first clock signal is delivered to at least one other of the plurality of units of the at least one core without restriction, wherein the reduced delivery of the first clock signal is at a lower frequency than a frequency of the first clock signal, the at least one core further including a clock crossing logic to couple the at least one core to a system agent logic of the processor, wherein the clock crossing logic is to operate at the first clock signal without restriction, and a buffer coupled to the clock crossing logic, the buffer to be written according to the first clock signal with the reduced delivery and to be read according to the first clock signal without restriction.

2. The processor of claim 1, wherein the clock generation logic is to prevent a first number of cycles of the first clock signal from being distributed to the plurality of units for each cycle of the first clock signal distributed to the plurality of units.

3. The processor of claim 1, wherein the plurality of units includes a first subset of units to receive the first clock signal with the reduced delivery and a second subset of units to receive the first clock signal without restriction.

4. The processor of claim 1, further comprising: a bypass path coupled between a first unit of the plurality of units and the clock crossing logic; and
a second path coupled between the first unit and the buffer, wherein the bypass path is to be blocked responsive to the restriction command.

5. The processor of claim 1, further comprising:
a first counter to count cycles of the first clock signal without restriction; and
a second counter to count cycles of the first clock signal with the reduced delivery.

6. The processor of claim 1, wherein the restriction command is received from the power controller of the processor responsive to detection of a thermal event of the processor, wherein the clock generation logic is to perform the reduced delivery of the first clock signal without stopping the at least one core.

7. The processor of claim 1, wherein the restriction command is received from the power controller of the processor responsive to a low power state exit request for a second core, wherein the clock generation logic is to perform the reduced delivery of the first clock signal without stopping the at least one core, the first clock signal at a turbo mode frequency.

8. The processor of claim 7, wherein the second core is to begin the low power state exit concurrently with the reduced delivery of the first clock signal.

9. A non-transitory storage medium having stored thereon instructions, which if performed by a machine cause the machine to perform a method comprising:
receiving a clock signal in a clock generation circuit of a core of a processor;
receiving a clock restriction command in clock restriction logic of the core from a power controller of the processor;
determining a restriction level based on the clock restriction command, the clock restriction command including a data portion having a value to indicate the restriction level;
controlling the clock generation circuit according to the restriction level to drive a restricted clock signal to at least one functional unit of the core, wherein the restricted clock signal includes a reduced number of cycles of the clock signal;
controlling a clock crossing logic of the core to operate at the first clock signal without restriction, and
controlling a buffer coupled to the clock crossing logic to be written according to the first clock signal with the reduced delivery and to be read according to the first clock signal without restriction.

10. The non-transitory storage medium of claim 9, wherein the method further comprises operating the core with the clock signal without restriction and thereafter operating the core with the restricted clock signal, without stopping the core.

11. The non-transitory storage medium of claim 9, wherein the method further comprises receiving the clock restriction command when the core is operating within at least a threshold of at least one processor constraint.

12. The non-transitory storage medium of claim 11, wherein the method further comprises determining whether the core is operating within the at least one threshold, including comparing at least one power consumption metric to the at least one threshold.

13. The non-transitory storage medium of claim 9, wherein the method further comprises receiving the clock restriction command responsive to a low power state exit request for a second core, and controlling the clock generation circuit to drive the restricted clock signal concurrently with the second core exit from the low power state.

14. A system comprising:
a multicore processor including a plurality of cores, each core including a clock generator to receive and distribute a first clock signal to a plurality of units of the core, a restriction logic to receive a clock restriction command and to cause reduced delivery of the first clock signal to at least one of the plurality of units without execution of a frequency change protocol while at least one other of the plurality of units is to receive the first clock signal without restriction, a power controller coupled to the plurality of cores to issue the clock restriction command to at least one core of the processor responsive to a determination that the at least one core of the processor is in operation within a threshold of a processor constraint, and a clock logic to provide the first clock signal to at least one of the plurality of cores, wherein a first core comprises:
a clock crossing logic to couple the first core to another portion of the processor, the first core and the other portion to operate at different frequencies; and
a buffer coupled to the clock crossing logic, the buffer to be written according to the first clock signal with the reduced delivery and to be read according to the first clock signal without restriction; and
a dynamic random access memory (DRAM) coupled to the multicore processor.

15. The system of claim 14, wherein the first core further comprises:
a bypass path coupled between a first unit of the plurality of units and the clock crossing logic; and
a second path coupled between the first unit and the buffer, wherein the bypass path is to be blocked responsive to the clock restriction command.

16. The system of claim 15, further comprising a second core, wherein the power controller is to send the clock restriction command to the first core responsive to a low power state exit request for the second core, and the clock generator logic is to perform the reduced delivery of the first clock signal responsive to the clock restriction command concurrently with the second core low power state exit.

* * * * *